3,160,679
UNSATURATED POLYESTER FLEXIBLE FILMS
Henry Y. Lew, El Cerrito, Calif., assignor to California Research Corporation, San Francisco, Calif., a corporation of Delaware
No Drawing. Filed Nov. 9, 1959, Ser. No. 851,544
15 Claims. (Cl. 260—861)

The present invention relates to the preparation of novel unsaturated polyesters, and to said unsaturated polyesters modified to produce flexible, tough compositions, including compositions having excellent film properties, such as good tensile strength, tear resistances and dimensional stability, low water absorption, and the like. These materials are useful as packaging films, membranes, flexible coatings, table cloths, shower curtains and the like.

Polyester resinous compositions prepared by the esterification of a glycol, such as ethylene glycol, with an unsaturated dicarboxylic acid or anhydride, such as maleic or fumaric, in which a portion of the acid is replaced with phthalic acid are known. It is also known to modify said resinous compositions by copolymerization with a compound containing the group $CH_2=C<$, such as styrene. In effecting the copolymerization, a polymerization catalyst, such as benzoyl or lauroyl peroxide or methylethylketone peroxide or tertiary butyl peroxide, with or without an accelerator such as cobalt naphthenate or tertiary amine compounds, is employed. The temperatures of copolymerization can vary from 20° C. to 150° C., depending on the catalyst employed. Curing of the mixture can be started at room temperature and completed at higher temperatures.

Unsaturated polyesters are generally regarded as non-film forming agents, useful, for example, in the preparation of structural laminates and rigid molded materials. Flexible polyesters have been prepared by the incorporation of a long chain saturated acid, such as adipic, but these resins are relatively high in cost. Suffice it to say that unsaturated polyesters as film-forming materials presently do not offer any serious competition to such conventional materials as polyvinyl chloride, polyethylene, and cellophane.

Physical properties which are most important for film applications are tensile strength, elongation, tear resistance, water absorption, and clarity. An ideal film material, particularly for packaging use, should be low-cost, and have high tensile strength and tear resistance for film strength, high clarity for appearance, low elongation for film rigidity, and low water absorption for resistance to moisture. No material found to date has all these properties. In actual practice, low-cost materials with good film strength but some tolerated deficiencies are used for film application. Unless these deficiencies are corrected by further processing, these materials have limited uses. Such is the case with cellophane; it has high water absorption and is thus sensitive to moisture; it is made moisture-proof by coating with a lacquer or only used uncoated for general wrapping purposes, where moisture protection is not needed. However, further processing is undesirable since it adds to the cost of film material. In order to determine what general properties and minimum film strengths are required for film application, reference is made to the properties of the two largest-volume commercial films, namely, cellophane and polyethylene. Cellophane has 4,400–18,600 p.s.i. tensile strength, 15–45% elongation, 110–515 lb./in. tear resistance, very good clarity, and 45—115% water-absorption, with polyethylene has 1350–2500 p.s.i. tensile strength, 50–600% elongation, 65–575 lb./in. tear resistance, 0–0.8% water-absorption, and poor clarity.[1] As mentioned above, the main deficiency of cellophane is its high water-absorption, whereas the main deficiencies of polyethylene are its lower tensile strength, higher elongation and poor clarity. A film with the clarity of cellophane and the low water-absorption of polyethylene and tensile strength, elongation and tear resistance intermediate between the two would be particularly useful in application where neither cellophane nor polyethylene is suitable—such as for packaging of cigarettes, candy and bread where moisture-proofness and clarity are essential. Films prepared in accordance with this invention have these properties.

Broadly, the present invention is based on the discovery that flexible, resinous compositions can be obtained from unsaturated polyesters, by the proper modification thereof, said unsaturated polyesters being formed by the esterification of an alpha, beta-ethylenically unsaturated dicarboxylic acid or acid anhydride, for example, fumaric or maleic, and about 1 to 5 mols per mol of said unsaturated acid of isophthalic or terephthalic acid or the esters thereof, hereinafter referred to as "phthalic acid material," with a blend of two or more different glycols, the blend having an average molecular weight in the range of 120 to 300. In making up the blend of differing molecular glycol species, the lowest molecular species can be monoglycol, such as ethylene and propylene glycol. Polymeric glycols, that is, the polyalkylene glycols can be employed of such molecular weight so that the unsaturated polyester will have a molecular weight, as hereinafter more fully discussed within the range 1000–4000, and preferably 2000–3000. Accordingly, a polyalkylene glycol having a molecular weight of about 1000 can be satisfactorily used with the lower molecular weight glycols in amounts calculated to yield a blend of glycols averaging 120 to 300 in molecular weight. Particularly useful are the polymers of ethylene and 1,2-propylene glycols. More particularly, these materials may be represented by the formula $HO(C_XH_{2X}O)_nC_XH_{2X}OH$, wherein X represents the numeral 2 and 3 for polyethylene glycol and polypropylene glycol, respectively; and $n$, a number ranging from 0 to about 25 in the case of polyethylene glycol, and 0 to about 20 in the case of the polypropylene glycols. In the case of ethylene and propylene glycol, $n$ is zero. These materials, as well as the polybutylene glycols, are available commercially. The polyglycol material is employed in amounts just sufficient to react with all of the carboxyl groups of the phthalic acid and aliphatic acid up to a 5 mol percent excess over and above the amount of glycol material required to react with the total acid groups.

The thus obtained unsaturated polyesters can then be reacted with a modifying copolymerizing vinyl compound containing the polymerizable group, $CH_2=C<$, such as styrene. In general, satisfactory amounts of the vinyl compound range from 30 to 60%, and the unsaturated polyester from 40 to 70% by weight. Other examples of solubilizing monomers, in addition to the preferred styrene, are other aryl mono-olefins, such as ring-substituted styrenes, for example, mono- and polyalkyl styrenes, mono- and polychlorostyrenes, in which the alkyl and chlorine radicals are substituted on the ring, etc. Other type vinyl compounds are vinyl esters, ketones and ethers; vinylidene halides, acrylic and methacrylic acids and their derivatives; e.g., amides, esters and nitrites. Diallyl esters of a saturated or aromatic dibasic acid and the substituted allyl esters, for example, diethallyl, and dimethallyl esters are also suitable, specific examples being diallyl phthalate, diallyl adipate, sebacate, glutarate etc. Monomer blends are also used to give improved

[1] Modern Plastics Encyclopedia, 1958.

properties; for example, styrene may be blended with methyl methacrylate in weight ratios of 1:3 to 3:1 to give better resistance to weathering in outdoor exposure.

A convenient method of preparing the compositions of the invention is described and claimed in U.S. Patent No. 2,904,533. In accordance with this procedure, the isophthalic acid is first reacted with the glycol, followed by the reaction with the unsaturated aliphatic polybasic acid, for example, fumaric. The unsaturated phthalic acid polyester is then admixed with a solubilizing monomer, for example, styrene, to form a solution. At the mixing stage, an inhibitor, such as hydroquinone or tertiary butylcatechol, is advantageously added to the unsatuarted polyester to stabilize the resin and prevent premature gelation or cross-linking. If desired, the stabilizer may be added at a prior time, namely during the preparation of the unsaturated polyester.

As hereinabove indicated, in carrying out the addition polymerization of the polymerizable monomer and unsaturated polyester, a catalyst is employed. Suitable catalysist are the hydroperoxide and peroxide initiators, such as benzoyl peroxide, methylethylketone peroxide, cyclohexanone peroxide, cumene hydroperoxide and the like. These can be employed in the customary amounts of 0.2% to 5.0%, based on the resin-monomer solutions. In addition, certain tertiary amines such as dimethylaniline, diethylaniline and N-ethyl-meta-toluidine and/or cobalt naphthenate (as 6% cobalt solution) as a promoter for the above initiators, are used in amounts of 0.01% to 2% by weight based on resin-monomers solution.

In the preparation of the flexible compositions of the invention, conventional principles are followed, for example, the isophthalic acid or dimethyl isophthalate or terephthalate is heated with the glycol material to reaction temperatures, that is, to a temperature in which water or methyl alcohol is expelled from the system; the reaction using isophthalic acid is continued to an acid number of below 30, preferably below 10, and the reactions using the methyl esters is continued until 95% of the theoretical amount of methyl alcohol is removed. The reaction is advantageously conducted under an inert atmosphere, for example, nitrogen or carbon dioxide. In the esterification of the phthalic acid material with the glycol, temperatures of the order of 370° F. to 450° F. and reaction times of 6 to 8 hours are usual, generally the longer the cooking time the greater the polyesterification and hence the higher molecular weight of the ester. When the esterification reaction is complete, as evidenced by low acid number or the cessation of water or methyl alcohol formation, the unsaturated aliphatic polybasic acid or acid anhydride, for example, maleic or fumaric, in an amount of about 0.15 to 1 mol per mol of phthalic acid material is added and caused to react with the esterification product of phthalic acid material and glycol. This reaction is also preferably carried out under an inert atmosphere at temperatures usually of the order of 400° F. to 450° F., for a period of time ranging from about 10 hours to 12 hours. The finished resin, when thus proceeding having an acid number below about 30, a calculated molecular weight between 1000 and 4000, preferably 2000 to 3000, and usually a Gardner-Holdt viscosity of G or greater for a 60% polyester-40% toluene solution, is then mixed with the desired proportion of copolymerizing vinyl monomer, for example, styrene. Above 150° F. the polyesters are sufficiently fluid to be readily mixed with vinyl monomers. In general, satisfactory amounts of the vinyl compound range from 30 to 60%, while the unsaturated polyester, from 40% to 70%, by weight.

In order more fully to illustrate the practice of the invention, the following examples are given. In the examples, the glycol material was employed in a stoichiometric excess of 2 to 5 mol percent over combined phthalic acid material and unsaturated aliphatic polybasic acid or acid anhydride. The viscosity of the polyester before admixture with styrene was determined on a solution of 60% polyester and 40% toluene using the Gardner-Holdt scale.

The vinyl monomer in the preparation of the film was added to the polyester at a temperature of 70° F. to 250° F. and mixed thoroughly to give styrene-polyester solution of 60% polyester and 40% styrene or vinyl monomer. To 100 parts, by weight, of the styrene-polyester solution were added 0.5 part of Lupersol DDM (60% methylethylketone peroxide in dimethyl phthalate), 1 part Luperco ATC (benzoyl peroxide compounded with tricresyl phosphate, the peroxide assaying 50%), and 0.15 part of 6% cobalt naphthenate. The mixture and catalyst was well mixed, filtered through a cloth screen, degassed in a vacuum desiccator to remove air bubbles, and cast between two sheets of cellophane or mylar film separated by a metal spacer to control film thickness to 0.014–0.018 inch. The film was then allowed to gel and then cured in an oven for 10–30 minutes at 250° F. to 300° F.

*Example 1*

718 parts of a blend of triethylene glycol and polyethylene glycol (molecular weight, 200) in a mol ratio of 3:1 (average molecular weight of glycol blend, 162) and 470 parts of isophthalic acid were charged to a reaction flask provided with a steam-jacketed distillation column for the separation of the glycol material from the water of reaction and to return the glycol material to the reaction vessel. The contents of the flask were blanketed with nitrogen and cooked at 430° F. to an acid number of 10. The reaction mixture was then cooled to 400° F. and maleic anhydride in the mol ratio of 1 mol to 2 mols of isophthalic acid together with 0.12 part of hydroquinone was added and the whole further cooked at a temperature of 430° F. to an acid number of 9. When 90–95% of the water of reaction was removed, the steam-jacketed distillation column was replaced by an aircooled distillation column. The maximum pot temperature throughout the reaction was 430° F., and the maximum overhead temperature was 230° F. The polyester had a Gardner-Holdt viscosity of I-J. The film prepared from this resin had the following properties:

Ultimate tensile strength, p.s.i. _____ 1900
Ultimate elongation, percent _____ 60
Water absorption, percent _____ 0.35
Tear resistance, lb./in. _____ 255

*Example 2*

Following the procedure of Example 1, an unsaturated polyester employing dimethyl isophthalate, maleic anhydride and a mixture of diethylene glycol and polyethylene glycol (molecular weight, 200) in a mol ratio of 1.88:1 (average molecular weight of glycol blend, 139). The dimethylisophthalate was employed in a mol ratio to maleic anhydride of 5:1. The film prepared from this material had the following properties:

Ultimate tensile strength, p.s.i. _____ 1900
Ultimate elongation, percent _____ 100
Water absorption, percent _____ 0.3
Tear resistance, lb./in. _____ 330

*Example 3*

One mol isophthalic acid, one mol maleic anhydride, and a mixture of propylene glycol and polypropylene glycol of molecular weight, 425, in a mol ratio 1:1 (average molecular weight of glycol blend, 250) were reacted as in Example 1. The polyester was cooked to an acid number of 11.3 and a Gardner-Holdt viscosity of G–H. The film had the following properties:

Ultimate tensile strength, p.s.i. _____ 1800
Ultimate elongation, percent _____ 60
Initial modulus in tension, $10^5$ p.s.i. _____ 0.03
Tear resistance, lb./in. _____ 170

Example 4

Following the procedure of Example 1, an unsaturated polyester was prepared from 3 mols isophathalic acid, 1 mol maleic anhydride and a glycol mixture containing triethylene glycol and polyethylene glycol (molecular weight, 1000) in the ratio of 93 mols to 1 mol (average molecular weight of glycol mixture, 159). The unsaturated polyester was cooked to an acid number of 12, a Gardner-Holdt viscosity of G. A film prepared from this resin had the following properties:

| | |
|---|---|
| Ultimate tensile strength, p.s.i. | 1500 |
| Ultimate elongation, percent | 95 |
| Tear resistance, lb./in. | 245 |

Example 5

An unsaturated polyester was prepared in accordance with the procedure of Example 1, from isophthalic acid, maleic anhydride, and a glycol mixture of triethylene glycol and polyethylene glycol (molecular weight, 200) in a mol ratio of the former to the latter of 16:1 (average molecular weight of glycol mixture, 153), the isophthalic-maleic mol ratio being 7:6. The polyester was cooked to an acid number of 11 and the viscosity on the Gardner-Holdt, G-H. The properties of the film were as follows:

| | |
|---|---|
| Ultimate tensile strength, p.s.i. | 3050 |
| Ultimate elongation, percent | 37 |
| Initial modulus in tension, $10^5$ p.s.i. | 4.7 |
| Tear resistance, lb./in. | 110 |

Example 6

Followng the procedure of Example 1, 3 mols isophthalic acid, 1 mol fumaric acid instead of maleic anhydride, and a mixture of diethylene glycol and polyethylene glycol-200 in molar ratio of 1.88:1 (average molecular weight of glycol mixture, 139) were reacted to an acid number of 14, a Gardner-Holdt viscosity of G-H. The film had the following properties:

| | |
|---|---|
| Ultimate tensile strength, p.s.i. | 3100 |
| Ultimate elongation, percent | 65 |
| Initial modulus in tension, $10^5$ p.s.i. | 1.4 |
| Tear resitsance, lb./in. | 250 |

Example 7

Three mols dimethyl terephthalate, 1 mol maleic anhydride and a glycol mixture of triethylene glycol and polyethylene glycol-300 in molar ratio of 3:1 (average molecular weight of glycol mixture, 188) were reacted as in Example 1. The polyester was cooked to an acid number of 14 and a Gardner-Holdt viscosity of I-J. The film from this resin analyzed as follows:

| | |
|---|---|
| Ultimate tensile strength, p.s.i. | 1150 |
| Ultimate elongation, percent | 120 |
| Initial modulus in tension, $10^5$ p.s.i. | 0.04 |

Example 8

Following the procedure of Example 1, 3 mols of dimethyl isophthalate, 1 mol of fumaric acid instead of maleic anhydride, and a glycol mixture of polyethylene glycols of 200 molecular weight and 600 molecular weight in molar ratio of 3:1 (average molecular weight, 300), were reacted to give a polyester with the following film properties:

| | |
|---|---|
| Ultimate tensile strength, p.s.i. | 800 |
| Ultimate elongation, percent | 190 |
| Tear resistance, lb./in. | 220 |

Example 9

Three mols isophthalic acid, 1 mol fumaric acid and a glycol mixture of diethylene glycol and polyethylene glycol-200 in a mol ratio of 1.88:1 (average molecular weight, 139) were reacted to an acid number of 14 and viscosity G-H, Gardner-Holdt.

The finished resin was then diluted with methyl methacrylate monomer in proportions of 60% polyester, 40% methyl methacrylate, the mixture being cured as before. The finished film had the following characteristics:

| | |
|---|---|
| Ultimate tensile strength, p.s.i. | 4400 |
| Elongation, percent | 75 |
| Initial modulus in tension, $10^5$ p.s.i. | 1.8 |
| Tear resistance, lb./in. | 190 |

The film from 60% polyester, 20% methyl methacrylate and 20% styrene had:

| | |
|---|---|
| Ultimate tensile strength, p.s.i. | 3800 |
| Elongation, percent | 70 |
| Initial modulus in tension, $10^5$ p.s.i. | 1.7 |
| Tear resistance, lb./in. | 220 |

Example 10

Three mols isophthalic acid, 1 mol fumaric acid and a glycol mixture of propylene glycol and polyethylene glycol-200 in molar ratio of 2:1 (average molecular weight, 117) were cooked to an acid number of 12 and viscosity of H, Gardner-Holdt.

Film made from 60% of this polyester and 40% styrene had the following properties:

| | |
|---|---|
| Ultimate tensile strength, p.s.i. | 2100 |
| Elongation, percent | 60 |
| Tear resistance, lb./in. | 240 |

Example 11

Following substantially the procedure of Example 1, a film was prepared from diethylene glycol and a mixture of 1,2-alkanediols of 12–22 carbon atoms, the various alkane diols being present in approximately equimolecular proportions, the diethylene glycol being employed in amount of 7 mols and the 1,2-alkanediol mixture in an amount of 1 mol (average molecular weight of total glycol, 127). The film had the following properties:

| | |
|---|---|
| Ultimate tensile strength, p.s.i. | 3700 |
| Elongation, percent | 30 |
| Initial modulus in tension, $10^5$ p.s.i. | 1.8 |
| Tear resistance, lb./in. | 90 |

Example 12

Unsaturated polyester from 3 mols of dimethyl isophthalate, 1 mol fumaric acid, and a glycol mixture of diethylene glycol and polypropylene glycol of 250 molecular weight in mol ratio of 2:1 (average molecular weight, 154) was mixed with styrene and cured to a film of the following properties:

| | |
|---|---|
| Ultimate tensile strength, p.s.i. | 3200 |
| Elongation, percent | 75 |
| Tear resistance, lb./in. | 270 |

Example 13

Example 1 was repeated except that there was employed a glycol mixture of diethylene glycol and glycerol monolaurate in a mol ratio of 5.3:1 (average molecular weight, 120) and an isophthalic to maleic ratio of 3:1. The finished film had the following properties:

| | |
|---|---|
| Ultimate tensile strength, p.s.i. | 800 |
| Elongation, percent | 75 |
| Initial modulus in tension, $10^5$ p.s.i. | 0.04 |
| Water absorption, percent | 0.45 |

As has been shown, tough, flexible compositions, including flexible films, having satisfactory film properties can be prepared economically from modified unsaturated polyesters. The compositions prepared in accordance with the invention, moreover, possess certain superior properties over conventional films. For example, the materials of the invention are thermosetting, that is, have no melting points, as opposed to polyethylene films which are thermoplastic in nature. Also, the compositions of the present invention do not require a plasticizer conventionally employed in the vinyl-type films, the loss of which in vinyl films causes embrittlement. Finally, as above indicated, the present compositions have good moisture resistance characteristics as compared with cellophane, which is normally provided with a coating to decrease water absorption by the cellophane.

I claim:
1. An unsaturated polyester composition useful in the preparation of flexible films which is the condensation product of (1) a phthalic acid material selected from the group consisting of isophthalic acid, terephthalic acid, and esters of isophthalic acid and terephthalic acid and a lower monohydric alcohol; (2) an unsaturated dicarboxylic acid material selected from the group consisting of fumaric acid, maleic acid, and maleic anhydride; and (3) a blend of at least two glycols, at least one of which is a polyalkylene glycol, said glycols being selected from the group consisting of ethylene glycol, propylene glycol, polyethylene glycol and polypropylene glycol, said blend of glycols having an average molecular weight in the range 120 to 300, any single glycol species of said blend not exceeding a molecular weight of 1,000; said phthalic acid material being employed in the range 1 to 5 mols per mol of unsaturated dicarboxylic acid material, and said glycols in an amount sufficient to neutralize the carboxyl groups up to a 5 mol percent stoichiometric excess; said ester having an acid number below about 30.

2. A composition according to claim 1 wherein the polyalkylene glycol is a polyethylene glycol.

3. A composition according to claim 1 wherein the polyalkylene glycol is a polypropylene glycol.

4. A composition according to claim 1 wherein the phthalic acid material is isophthalic acid.

5. A composition according to claim 1 wherein the unsaturated dicarboxylic acid material is maleic anhydride.

6. A composition according to claim 1 wherein the phthalic acid is isophthalic acid, the polyalkylene glycol is polyethylene glycol, and the unsaturated dicarboxylic acid material is maleic anhydride.

7. A flexible film of a copolymer consisting essentially, by weight, of (1) 30 to 60 percent copolymerizable compound containing the polymerizable group $CH_2=C<$; and (2) 40 to 70 percent unsaturated polyester which is the condensation product of (a) a phthalic acid material selected from the group consisting of isophthalic acid, terephthalic acid, and esters of isophthalic acid and terephthalic acid and a lower monohydric alcohol; (b) an unsaturated dicarboxylic acid material selected from the group consisting of $\alpha,\beta$-ethylenically unsaturated dicarboxylic acids, and their anhydrides; and (c) a blend of at least two glycols, at least one of which is a polyalkylene glycol, said glycols being selected from the group consisting of ethylene glycol, propylene glycol, butylene glycol, polyethylene glycol, polypropylene glycol, and polybutylene glycol, said blend of glycols having an average molecular weight in the range 120 to 300, any single glycol species of said blend not exceeding a molecular weight of 1,000; said phthalic acid material being employed in the range 1 to 5 mols per mol of unsaturated dicarboxylic acid material, and said glycols in an amount sufficient to neutralize the carboxyl groups up to a 5 mol percent stoichiometric excess; said ester having an acid number below about 30.

8. A film according to claim 7 wherein the phthalic acid material is isophthalic acid.

9. A film according to claim 7 wherein the polyalkylene glycol is polyethylene glycol.

10. A film according to claim 7 wherein the unsaturated dicarboxylic acid material is maleic anhydride.

11. A film according to claim 7 wherein the polyalkylene glycol is polypropylene glycol.

12. A film according to claim 7 wherein the phthalic acid material is terephthalic acid.

13. A film according to claim 7 wherein the phthalic acid material is isophthalic acid, and the unsaturated dicarboxylic acid material is maleic anhydride.

14. A film according to claim 7 wherein the unsaturated dicarboxylic acid material is fumaric acid.

15. A film according to claim 7 wherein the copolymerizable monomer is selected from the group consisting of methyl methacrylate and styrene.

References Cited in the file of this patent

UNITED STATES PATENTS

| 2,595,625 | Agnew | May 6, 1932 |
| 2,255,313 | Ellis | Sept. 9, 1941 |
| 2,532,475 | Anderson | Dec. 5, 1950 |
| 2,562,878 | Blair | Aug. 7, 1951 |